United States Patent
Rainey et al.

(10) Patent No.: US 6,205,210 B1
(45) Date of Patent: Mar. 20, 2001

(54) METHOD FOR IMPROVED AUTOMATIC MESSAGE ACCOUNTING IN TELEPHONY

(75) Inventors: Gordon L. Rainey; Allan Melnyk, both of Kanata (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 08/743,486

(22) Filed: Nov. 4, 1996

(51) Int. Cl.[7] ................................................ H04M 15/00
(52) U.S. Cl. ........................ 379/114; 379/113; 379/115; 379/126; 379/207
(58) Field of Search ..................... 379/111, 112, 379/113, 114, 115, 118, 121, 126, 133, 201, 207, 211, 219, 220, 221, 222, 224, 229, 230

(56) References Cited

U.S. PATENT DOCUMENTS

| | | | |
|---|---|---|---|
| 5,381,467 | * 1/1995 | Rosinski et al. | 379/121 |
| 5,506,893 | 4/1996 | Buscher et al. . | |
| 5,511,113 | * 4/1996 | Tasaki et al. | 379/115 |
| 5,572,579 | * 11/1996 | Orriss et al. | 379/115 |
| 5,610,977 | * 3/1997 | Williams et al. | 379/220 |
| 5,699,416 | * 12/1997 | Atkins | 379/115 |
| 5,712,908 | * 1/1998 | Brinkman et al. | 379/119 |
| 5,748,717 | * 5/1998 | Chan et al. | 379/115 |
| 6,021,126 | * 2/2000 | White et al. | 370/352 |

FOREIGN PATENT DOCUMENTS

| | | |
|---|---|---|
| 95307183.4 | 4/1996 | (EP) . |
| 97108137.7 | 11/1996 | (EP) . |

OTHER PUBLICATIONS

UK Patent Office, Search Report under Section 17, Jan. 15, 1998, 1 page, United Kingdom.
UK Patent Office, Combined Search and Examination Report under Section 17 & 18 (3), Jan. 16, 1998, 1 page, United Kingdom.

* cited by examiner

Primary Examiner—Curtis A. Kuntz
Assistant Examiner—Binh K. Tieu
(74) Attorney, Agent, or Firm—Foley & Lardner (57) ABSTRACT

A method for improved automatic message accounting in telephony systems and the like, wherein actual call routing set-up is stored at the time of a call being answered by a called subscriber station; and the data conveying the actual call routing set-up is packaged in a data field of a message for upstream transmission through the actual call routes.

4 Claims, 5 Drawing Sheets

METHOD FOR IMPROVED AUTOMATIC MESSAGE ACCOUNTING IN TELEPHONY

CROSS-REFERENCE TO RELATED APPLICATION

The present invention is related to commonly assigned, previously filed application by MARTINEZ et al. for ENHANCED EFFICIENT TELEPHONE NUMBER PORTABILITY, Ser. No. 08/534,668, filed Sep. 27, 1995, and which is incorporated herein by reference.

BACKGROUND OF THE INVENTION

1. Field of the Invention

The present invention relates to telephony systems in general, and to methods of collecting data within such systems for purposes of accounting and billing subscribers and users of the telephony and the like systems. More particularly still, it relates to methods of collecting and communicating data respecting redirected telephone calls. More particularly still, it relates to such data in the case of calls originated from an end (switching) office (EO) to a telephone number that had been ported from one EO to another EO. Number portability (NP)and local number portability (LNP) are an inevitable fact of telephony in the present environment of competition between service providers.

2. Related Art

Toll call rating today is based primarily on time and distance. The AMA (automatic message accounting) record includes the call duration (time) and both the calling and called NPA-NXXs (meaning the digits of numbering plan areas plus the three digits of the office code) from which the V/H (Vertical and Horizontal) coordinates of the calling and called rate centres are determined. From the V/H coordinates, the distance and distance band are calculated. From the distance band the call rate is determined.

When new NXXs are introduced on switches or rate centres are modified, all carriers are advised in advance so that necessary trunking translations and billing process adjustments can be made. Currently the LERG (local exchange routing guide) NPA-NXX designations are geographically fixed and each has a set of V/H coordinates for billing purposes. The frequency of such NPA-NXX additions/changes is at present relatively low.

The geographically significant LERG designated NPA-NXX codes are general used as the basis for distance calculations and toll call rating by downstream operations systems. In situations where calls are redirected, either the redirecting party pays or special arrangements are made for billing. There is no vehicle to return the redirected destination information back through the network for billing purposes. In 'calling party pays' situations, end-user AMA information, such as the called destination, is typically captured near the head-end of the call. However, some calls may be subsequently redirected to a different (toll) destination (as in the case of LNP with location portability).

If the originating switch redirects the call to a destination other than that dialed, then it can include the new destination routing number in the AMA record for toll calls and the call can be accurately billed. However, if the call is redirected at an intermediate switching point, the prime (upstream) AMA switches (typically the originating switch, access tandem or first IXC tandem) may not have complete destination information for accurate call rating. The absence of complete call rating information in the AMA records for redirected calls will complicate downstream processing. Without this information, the process would have to correlate switch AMA information from more than one source or process partial AMA information against other databases to rate redirected calls. In the case of "real time" billing systems, a technique will be required to retrieve appropriate redirection information quickly.

SUMMARY OF THE INVENTION

It has been realized, that the only time all the information for accounting and toll rating is most conveniently available is at the time of call set-up. The present method has, therefore, been devised to capture the call set-up information and make it available for centralized automatic message accounting (CAMA) or local automatic message accounting (LAMA), where the local exchange carrier (LEC) or the inter-exchange carrier (IXC) keeps the primary record of calls. To achieve the objective, new switch call processing logic and common channel signalling are used. The call processing logic captures the call set-up data, and the common channel signalling returns it (including new destination information) to the upstream AMA recording points for inclusion in the record of the call. This allows current downstream billing processes to be used in call rating. In addition, "real time" billing applications, when implemented, will be able to take advantage of this capability to provide accurate billing information in real time.

This current accounting and billing practice is unaffected, where for regular "calling party pays" end-user billing of toll calls, the AMA recording is done by the originating LSP (local service provider), if it is intraLATA (local access and transport area) toll or casual dialled inerLATA toll. For presubscribed toll, the main AMA record is generated by the IXC POP (point of presence) tandem. For casual dialled interLATA toll, the IXC does detailed AMA at the originating POP tandem for division of revenue purposes. A single switch can serve more than one rate centre and the called exchange name is currently entered in the bill for all calls.

In summary, the present method addresses the billing needs of service providers when calls are redirected to other than the LERG designated destination represented by a dialled ported DN (directory number). This may arise for any 'calling party pays' service when a call is redirected, and for LNP when location portability is extended across the rate centre boundaries. In particular, the method is directed to solving the billing issues related to interLATA LNP and intraLATA PIC (Preferred IntraLATA Carrier) LNP.

Accordingly, the present invention provides a method for improved automatic message accounting in telephone systems and the like, comprising the steps of:
  (a) storing actual call routing set-up at time of a call being answered by a called subscriber station; and
  (b) packaging data conveying said actual call routing set-up in a data field of a message for up-stream transmission through actual call routes.

In a further aspect of the present method, it comprises the additional steps of:
  (i) analysing a received initial address message (IAM) to recover a generic address parameter (GAP) or a location routing number (LRN);
  (ii) establishing connection to a called party corresponding to said GAP or LRN;
  (iii) composing an answer message (ANM) incorporating said GAP or LRN; and
  (iv) conveying said ANM upstream to a preceding switch node through which said IAM was received.

In yet anther aspect of the present method, it comprises the additional steps of:

(i) analysing a received answer message (ANM) to recover a generic address parameter (GAP) or a location routing number (LRN);

(ii) updating a local automatic message accounting (AMA) record in accordance with said GAP or LRN;

(iii) composing a transmitted ANM incorporating said GAP or LRN; and (iv) conveying said transmitted ANM up stream to a preceding switch node connected to a switch node through which said received ANM was received.

BRIEF DESCRIPTION OF THE DRAWINGS

The preferred embodiments of the present invention will now be described in detail in conjunction with the annexed drawings, in which.

DETAILED DESCRIPTION OF THE PREFERRED EMBODIMENTS

Figure 1:
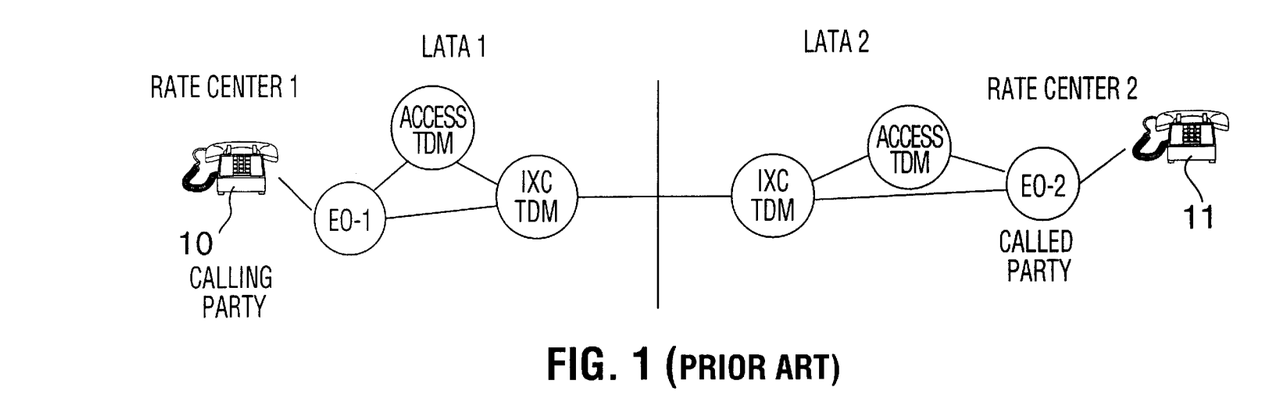
FIG. 1 is a high level schematic illustrating present standard telephone connection route between a calling and a called party without either party having been ported.

FIG. 1 of the drawings shows the set-up of the standard telephone connection between a calling party 10 served by EO-1 in LATA 1 and in called party 11 served by EO-2 in LATA 2. The EO-1 of the calling party and the IXC TDM switch have all the data necessary for the automatic message accounting AMA record, i.e. the calling party 10 number, the called party 11 number, the date, the time of connect, and the time of disconnect. These are stored in the primary LAMA record of EO-1. From the calling party 10 NPA(1)-NXX(1) and the called party 11 NPA(2)-NXX(2), the calling-(V,H) and the called-(V,H) coordinates are determined and the "distance" is calculated, whereby the "distance band", call duration, TOD (time of day), DOY (day of year), call rate, etc. are determined by downstream billing systems. As may be seen, had the called party 11 number NPA(2)-NXX(2) been "ported" to a third end-office, in a different rate centre, the information stored in the primary LAMA record of EO-1 would be wrong or incomplete.

Figure 2:
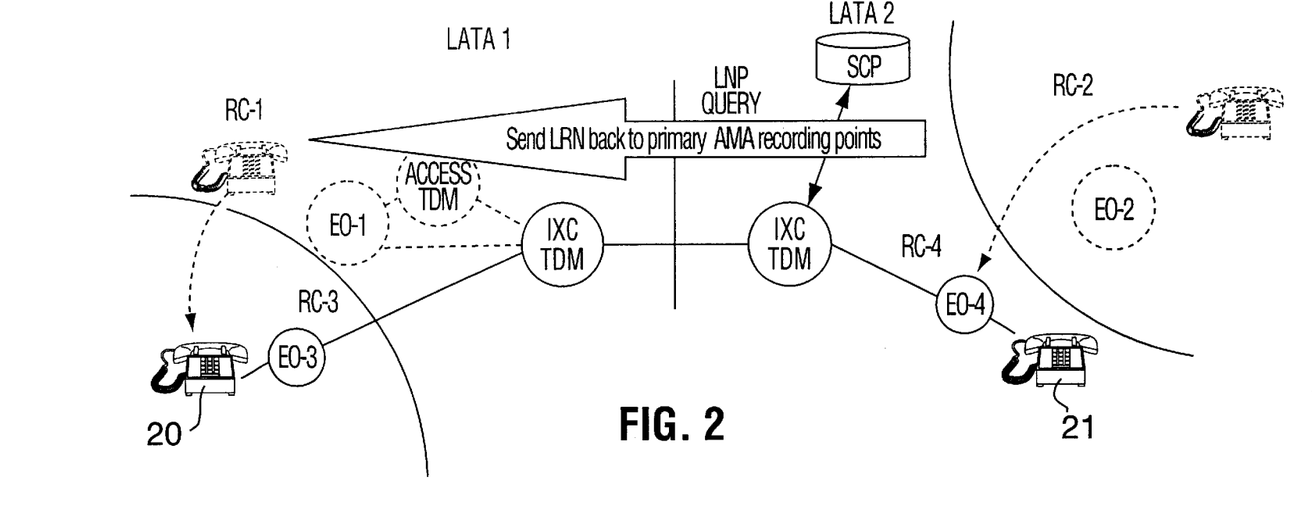
FIG. 2 illustrates a telephone call set-up between two parties each of which had been ported from original end-offices to ported end-offices and wherein the method of the present invention is applied.

In FIG. 2, the general scenario of ported calling and called parties is shown, where a calling party 20 having been pointed from EO-1 to EO-3, and a called party 21 from EO-2 to EO-4, the original EO-1, Access TDM and EO-2 being shown in "ghost" outlines. Thus, while the original numbers NPA(1)-NXX(1) and NPA(2)-NXX(2) have not been changed, the physical location of the parties 20 and 21 is in fact now different, and the party 20 and its EO-3 does not know that the party 21 no longer physically corresponds to NPA(2)-NXX(2) and the EO-2. The aim of the present preferred embodiment is to capture, at the time of call set-up, the location routing number (LRN) information and send it back upstream to the primary AMA recording points, i.e. to the EO-3 and the IXCTDM. This is indicated graphically by the large arrow pointing from LATA 2 to LATA 1. This would permit the LAMA records to contain adequate information so that subsequent processing may compute the correct (V,H)-3 and (V,H)-4 coordinates.

The present preferred embodiment is directed particularly to the situation where the PSTN intelligent network (IN) or advanced intelligent network (AIN) are supporting local number portability (LNP), which allows subscriber station numbers to move to different rate centres, within the PSTN, without being changed. However, the application of the present method is not restricted to LNP scenarios, although it significantly facilitates the practical implementation of LNP.

The basic call scenario is where a station (subscriber) dials a station number that is located on a switch node some distance from the originating switch node (e.g. long distance/toll calling, inter-LATA calling). Typically, the originating switch node (i.e. the one to which the calling subscriber's station is connected) is able to determine that the called number is not connected to the same switch nor another local switch, from translations within the switch node (e.g. 0/1 prefix, carrier access code, etc.) Typically, the originating switch node is a local automatic message accounting (LAMA) switch which means it is responsible for tracking and recording billing details for the call. As such, it begins collecting information about the call in preparation for recording this information at the time of disconnect of the call. The information collected is ultimately recorded into an AMA system which follows published standards which describe the appropriate information based on various aspects of the call (e.g. coin calling, collect calling, etc.). For this call scenario, the call progresses through the network by typically passing from the originating End Office (EO) switch node to an Access Tandem (AT) switch node. The AT provides the local calling area access to Inter-Exchange Carriers (IXC) which route calls around the communication network to other local calling areas (i.e. EO switch nodes). The AT switch nodes may or may not carry out a billing function (e.g. Centralized Automatic Message Recording—CAMA) depending on network setup. Typically, from the AT switch node, the call progresses into the IXC network. At the entry point switch node, a billing function may or may not be carried out depending on network setup. With AIN LNP implementation, the entry point switch node is not required to involve a database query as part of the AIN LNP procedure. It attempts to route the call using normal translations to the expected "exit point" switch node in the IXC network. Of course, with no LNP in the network, this is straight forward and ultimately the call would exit the IXC network into the destination local calling area (i.e. destination station number's switch node), and all billing information about the call would be accurate. With LNP involved, the destination station number has moved from one switch node to another switch node; the EXC network then attempts to route the call through its network to an "exit point" switch node using "normal" translations (i.e. translations that rely on Area Code and Office Code mappings in the dialled station number). As part of the AIN LNP implementation, the "next to last" switch node (i.e. typically the "exit point" switch node in the AXC network) would determine the final destination for the dialled station number by "launching" a query to a database to retrieve the destination switch node. The "exit point" switch node would then route the call accordingly. The destination AT switch node (i.e. access to the destination local calling area) may or may not carry out a billing function. However, if it does, the information contained therein would be accurate since all details about the call are known or exist in the messaging to route the call to this point in the communication network. This is only true after the successful completion of the AIN LNP query process (i.e. the true destination of the called station number is recovered) in the "exit point" switch node in the IXC network. Any or all AMA call details recorded after this point are also accurate. However, any or all AMA call details previous to this point are incomplete or inaccurate. Upon completion of the call (i.e. subscribers hang up their phones), all AMA details are completed and the records are closed. Ultimately, they are gathered for "downstream" processing to be configured into a bill for the customer and divisions of revenues for the operating companies involved in the call.

To ensure the AMA call details are complete, the preferred embodiment relies on the signalling systems that are now in place in the communication network to send back data to the AMA recording points along the connection path. In addition, because this messaging can typically take place before the AMA details are formally written into an AMA record (i.e. prior to call disconnect), the ultimate written record contains all the necessary information to ensure proper processing downstream. This method relies on the use of SS7 signalling between the switch nodes in the communication network. The existing standards and implementation of SS7 in the network contain two kinds of message types that can be used to carry out this method (i.e. send back called station data through the network to billing nodes along the connection path), namely, ISUP and TCAP messaging.

Figure 3:
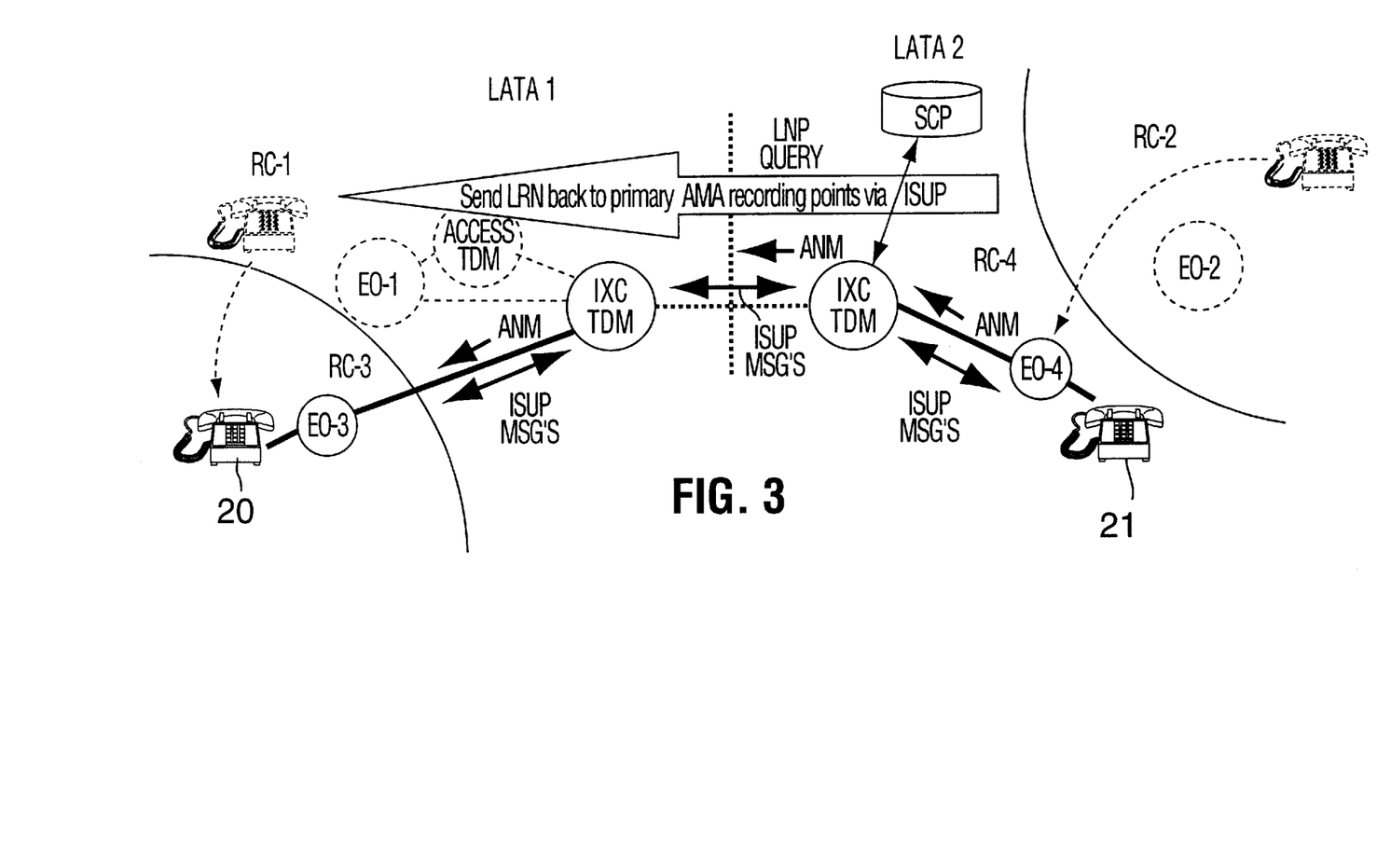
FIG. 3 illustrates a situation similar to in FIG. 2, wherein a basic ISUP based implementation is shown.
Figure 4:
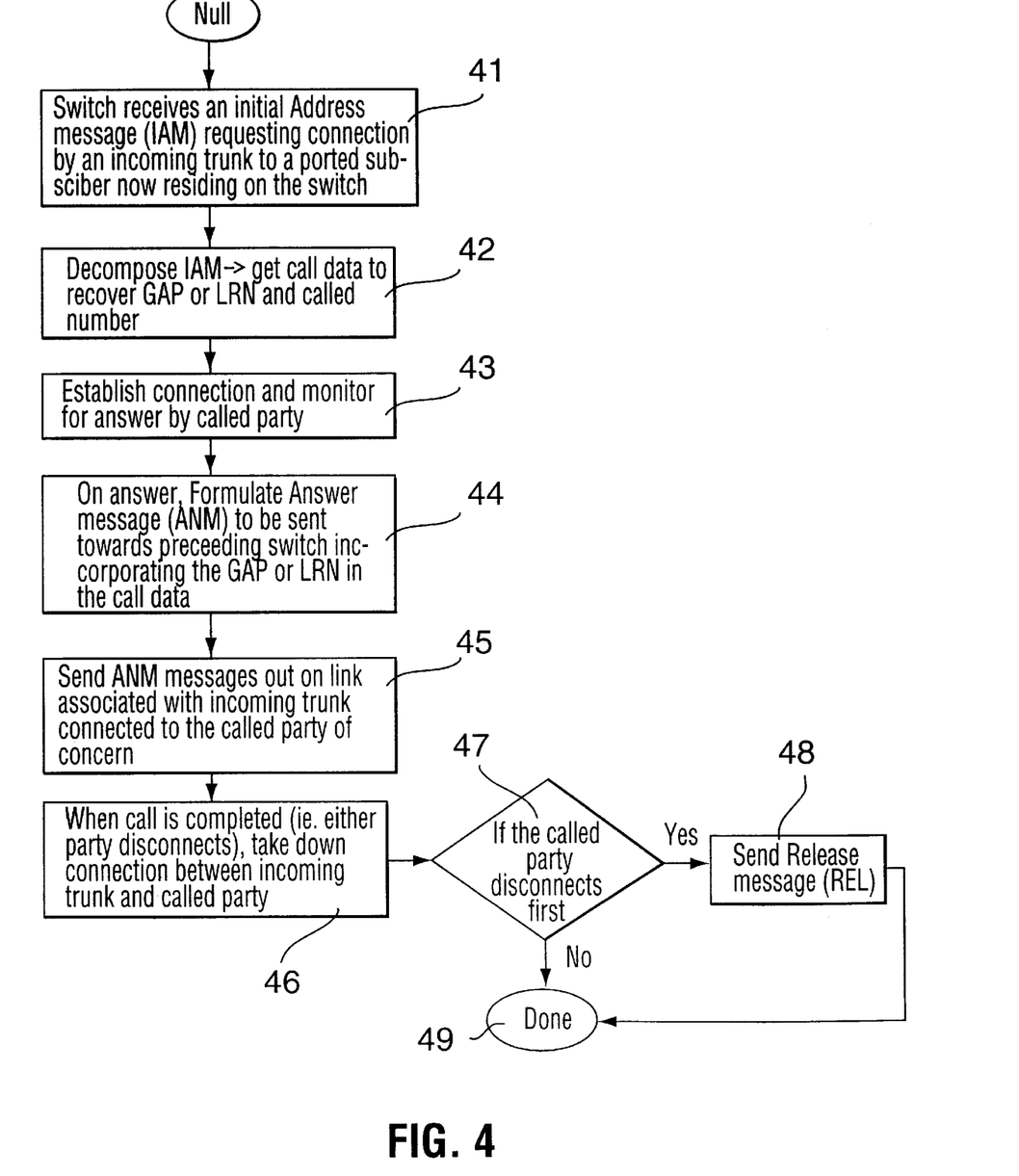
FIG. 4 is a flow-chart illustrating the processing required at the destination switch EO-4 shown in FIG. 3.

Referring now to FIGS. 3 and 4, the use of the ISDNUP (ISUP) and ISUP message structure to implement the method of the present invention will be explained.

An advantage of using ISUP is that ISUP messages are already used for call connection control and as such follow the switch node chain in the overall network connection. That is, certain ISUP message types propagate along the call path and, therefore, any "billing" switch nodes along the call path will "see" these messages.

Such messages, for example, are REL (release), ANM (answer message), ACM (answer complete message), etc. In the example of FIGS. 3 and 4, the ANM message is the "vehicle" used for implementing the method.

Referring to FIG. 3, each connection segment from switch node to switch contains an ISUP protocol conversation ultimately involving an answer message if the called station answers the call. The answer message (ANM) at each segment is a "reconstruction" of the message received from the previous node in the call path. This is covered by existing known stats.

This "chaining" of ANM messages is initiated by the destination switch node when the called station answers the call. Just prior to this, the destination switch node is in a position such that it has complete data about the "true" called number. Thus if the destination switch node packages this data in the answer message (ANM), then it will transverse the communication network back to the originating switch node passing any billing switch nodes along the way, Thus each of the billing switch nodes is able to decode the message and update the appropriate billing data for the call.

In addition, because this information is received typically before the call is disconnected, the associated AMA record that will be written at disconnect time contains all the call information to properly bill the call in the downstream process.

Figure 5:
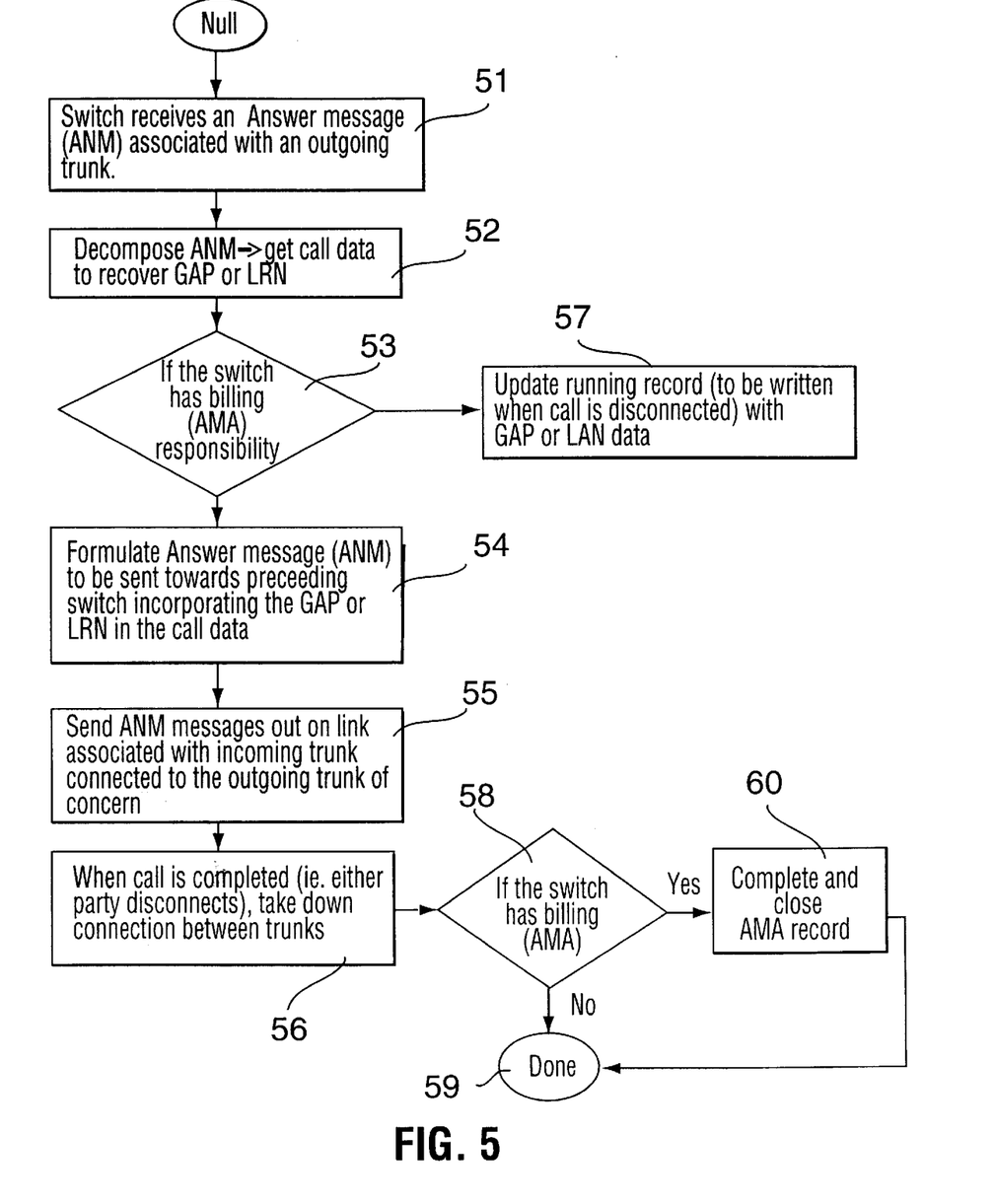
FIG. 5 is a flowchart illustrating the processing required at the intermediate IXC-TDM switches shown in FIG. 3.

Referring now to the flowcharts in FIGS. 4 an 5, they illustrate the processing which takes place at the destination switch, and at the intermediate switches, respectively. In FIG. 4, the steps of processing are as follows:

41: At the destination office at the end of the call path, the impacted process starts with the receipt of an Initial Address message (IAM) associated with an incoming trunk requesting connection to a ported subscriber that now resides on the switch.

42: The switch decomposes (analyses, decodes or examines) the message extracting the GAP or LRN along with the called number from the call data that was received.

43: The switch sets up the connection and monitors the connection for Answer by the called party.

44: On Answer, the switch formulates an Answer message (ANM) that will again include the GAP or LRN that was received (or can be derived since this switch "knows" it is the destination).

45: The switch sends the Answer message out on the link associated with the incoming trunk (towards the proceeding office) that is connected with the called party.

46: Once the call is complete (i.e. either party hangs up—indicated by release message being received from the far end or subscriber disconnect at the switch), the connected is taken down.

48: IF the called party disconnects first, the switch composes and sends a release message towards the proceeding switch associated with the incoming trunk that was involved in the connection.

In FIG. 5, the steps of processing are as follows:

51: For an initiate office along the call path, the impacted process starts with the receipt of an Answer message (ANM) associated with an outgoing trunk.

52: The switch decomposes (analyses, decodes or examines) the message extracting the GAP or LRN from the call data that was put in by the previous switch.

53: If the switch has responsibility for maintaining AMA information about the call, then the extracted data is incorporated into the "running" record keeping system (box 57). Normally, a buffer or active bookkeeping record is made of calls in progress. When the call is completed, this buffer is completed with disconnect times, closed, written to a more permanent facility in the form of a standard AMA record for processing by downstream or off-switch processing. This is completed in step 60.

54: The switch formulates an Answer message that will again include the GAP or LRN that was received in step 53.

55: The switch sends the Answer message out on the link associated with the incoming trunk (towards the preceding office) that is connected with the outgoing trunk that the original Answer message (step 51) was received for.

56: Once the call is complete (i.e. either party hangs up—indicated by release messages being received at the various intermediate switches along the call path), the connection is taken down.

58: If the switch has responsibility for maintaining AMA information about the call, then the active or "running" buffer is completed with disconnect times, closed and written to a more permanent facility for processing by downstream or off switch processing. This facility is now able to readily process the information because the record includes "true" information about the end points of the connections which can be used to accurately calculate the coordinates for distances and call rating.

Figure 6:
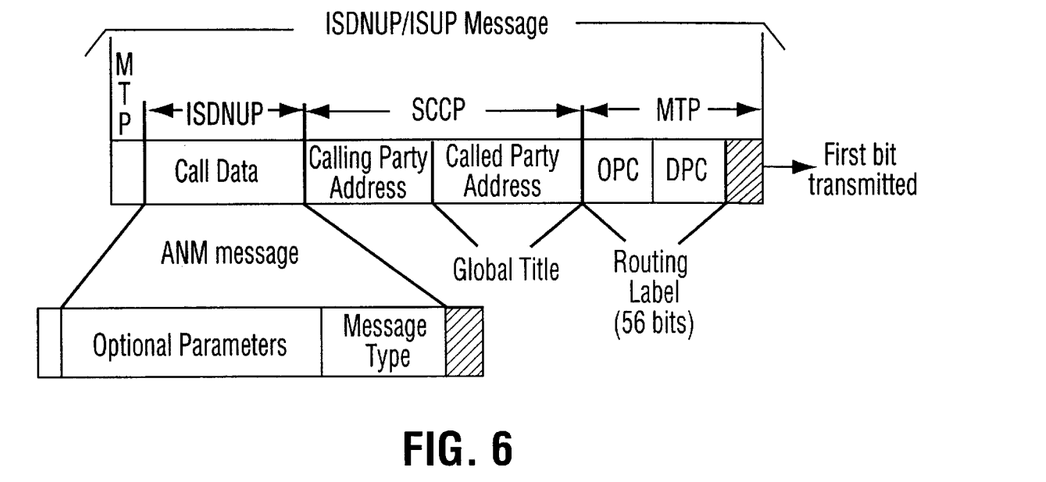
FIG. 6 illustrates a CCS7 ISDNUP (ISUP) message for the scenario shown in FIG. 3.

The format of the ANM is provided in FIG. 6. At the destination node, when the called station answers, the ISUP process application in conjunction with the switch node, must compose an appropriate ANM that includes the "true" called number and switch identity (or equivalent for the called party). Other switch nodes along the call path must receive the ANM message from the previous switch node and "rebuild" the message to be sent to the next switch node. If the switch node is a billing node, it receives the ANM message and "digests" the information contained therein to incorporate into any AMA recording about the call. Thus the destination switch node would compose the appropriate data and include it in the answer message. However, other switch node points in the call path contain adequate information about the "true" called number and switch identify as a result of a query transaction (e.g. the switch node at the exit point from the IXC network). Thus, since the ANM message sent by the destination office passes through the switch node at the exit point from the IXC network, this switch node is also able to "recompose" the ANM to include the appropriate data. It is desirable that only one switch node have this responsibility for any given call scenario. Implementation trade offs will determine which switch node has this capability.

The Common Channel Signalling number 7 (CCS7) messages and telephone calls are routed in accordance with information imbedded in CCS7 messages. The two types of CCS7 messages that are relevant are the CCS7 ISDN User Part (ISDNUP or ISUP) (shown in FIG. 5) and the Intelligent Network (IN) Transaction Message or Package (TCAP).

The CCS7 messages have three parts:
Message Transfer Part (MTP) which contains the routing label including the Origination Point Code (OPC) and Destination Point Code (DPC).
Signalling Connection Control Part (SCCP) which contains the Global Title information
Data field which either contain
Data for Call Setup. The Data for call set up is defined as ISDN User Part (ISDNUP or ISUP) data, or
Data for database services. This data is defined as Transaction Capability Application Part (TCAP) data.

All data packets (or packages) sent across the network must have the originating and terminating port asses imbedded in the packet header. In the Signalling System number 7 (SS7) terminology, these addresses are called the Originating Point Codes (OPC) and Destination Point Codes (DPC).

The sematics of ISUP messaging are well defined in that the basic operation of ISUP messaging is known in terms of the administration of the routing labels and data fields (e.g. for ANM). The present method slightly modified this operation in terms of the data field. (All other sematics remain basically the same with the exception that each switch node process must know how to deal with this "new" data).

The "call data" fields for ANM are modified to include an identifier to indicate the "new re-directed" destination. This identifier may be the LRN of the terminating station. However, the present method is not limited to LRN but can work with any identifier that the industry ultimately chooses to uniquely define the terminating office. Recent additions to GR-317 (Generic Requirements for Call Control) have defined a GAP parameter (Generic Address Parameter). This parameter and its sub-field definition could be used in the resulting message to the information back through the SS7 network. However, GAP as presently defined is normally associated with an IAM message (Initial Address Message) sent in the forward direction. The present method would require that the GAP be included in an ANM (or equivalent) message for reverse direction message flow.

Figure 7:
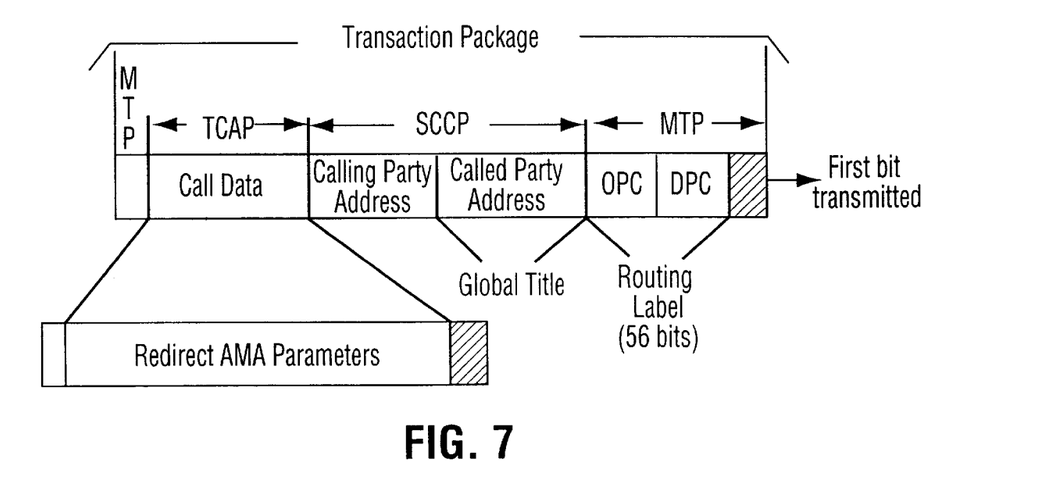
FIG. 7 illustrates a CCS7 transaction package for an alternative TCAP scenario instead of the ISUP scenario shown in FIG. 3.

For implementation of the present method within an intelligent network (IN) of the PSTN, the transactional message or package as shown in FIG. 5 is the messaging vehicle in its TCAP portion. A typical redirected AMA conversation for TCAP is as follows:

Each switch node will populate routing parameters in the message to allow a transactional conversation to take place between it and its neighbour in the "reverse" call path direction. Thus in FIG. 7, when the called station answers, the far end switch node would compose a TCAP message with the appropriate information:
(i) DPC=the "next previous" switch node in the connection path
(ii) OPC=the point code of itself
(iii) Call Data=as proposed (i.e. GAP/LRN, TRID, SSN Trk Grp/Ckt #)
(iv) Msg Type=INFO.

Upon receipt, the "next previous" node would send back an acknowledge (e.g. Msg Type=ACK) message to the sending switch node (note, if there was an application failure, then a NAK would be sent along with error data in the Call Data field). The "next previous" switch node would then continue the message process with the "next next previous" switch node in the fashion stated above. This process would continue until the TCAP chain had reached back to the switch node of the originating station.

The ACK/NAK message is used to complete the "transactional conversation" with the far switch node and thus satisfy the appropriate application (i.e. AMA redirect application) running in that node. This will allow for the release of resources such as transaction id's (TRIDs).

The switch node will send back an ACK message if the AMA redirect application is successfully able to carry out its duties in "forwarding" the information on to the next previous node.

For the ACK message, the Redirect AMA Parameters will contain the following:
(i) DPC=the "far" switch node that sent the original INFO message
(ii) OPC=the point code of itself
(iii) Call Data=as proposed (i.e. GAP/LRN, TRID, SSN, Trk Grp/Ckt #) but with the Trk Grp/Ckt initialized to all 1's, TRID, SSN left as received, GAP/LRN does not matter (i.e. zeroed or left as received)
(iv) Msg Type=ACK The switch node will send back an NAK message if the AMA redirect application is unsuccessful at carrying out its duties in "forwarding" the information on to the next previous node.

For the NAK message, the Redirect AMA Parameters will contain the following:
(v) DPC=the "far" switch node that sent the original INFO message (vi) OPC=the point code of itself (vii) Call Data=as prosed (i.e. GAP/LRN, TRID, SSN, Trk Grp/Ckt #) but with the Trk Grp/Ckt initialized to an error code to indicate the potential problem this application encountered, TRID, SSN left as received, GAP/LRN does not matter (i.e. zeroed or left as received)

(viii) Msg Type - NAK.

What is claimed is:

1. A method for automatic message accounting in a telephony system, comprising:

(a) receiving, by a switch, an initial address message (IAM) requesting connection by an incoming trunk to a ported subscriber that is currently residing on the switch;

(b) decomposing the IAM to obtain call data in order to recover a called number and at least one of a generic address parameter (GAP) and a location routing number (LRN);

(c) establishing a connection to a called party and monitoring for an answer by the called party;

(d) when the monitoring step determines that the called party has answered, formulating an answer message that is sent in a direction towards a preceding switch that incorporates the GAP or the LRN in call data, and storing actual call routing set-up at time of a call being answered by a called subscriber station;

(e) sending the answer message out on a link associated with an incoming trunk connected to the called party, and packaging data conveying said actual call routing set-up in a data field of a message for upstream transmission through actual call routes; and (f) when the connection is finished, taking down the connection between the incoming trunk and the called party.

2. The method as defined in claim 1, further comprising:

(g) if the called party disconnects before a calling party disconnects, sending a release message.

3. The method as defined in claim 1, further comprising:

(g) when the switch has a billing responsibility, updating a running record with the GAP or the LRN.

4. The method as defined in claim 3, wherein the running record is written into a memory when the connection is finished.

* * * * *